May 17, 1932.  H. HEYMANN ET AL  1,858,328
CONVEYING OF MATERIAL
Filed Oct. 27, 1925
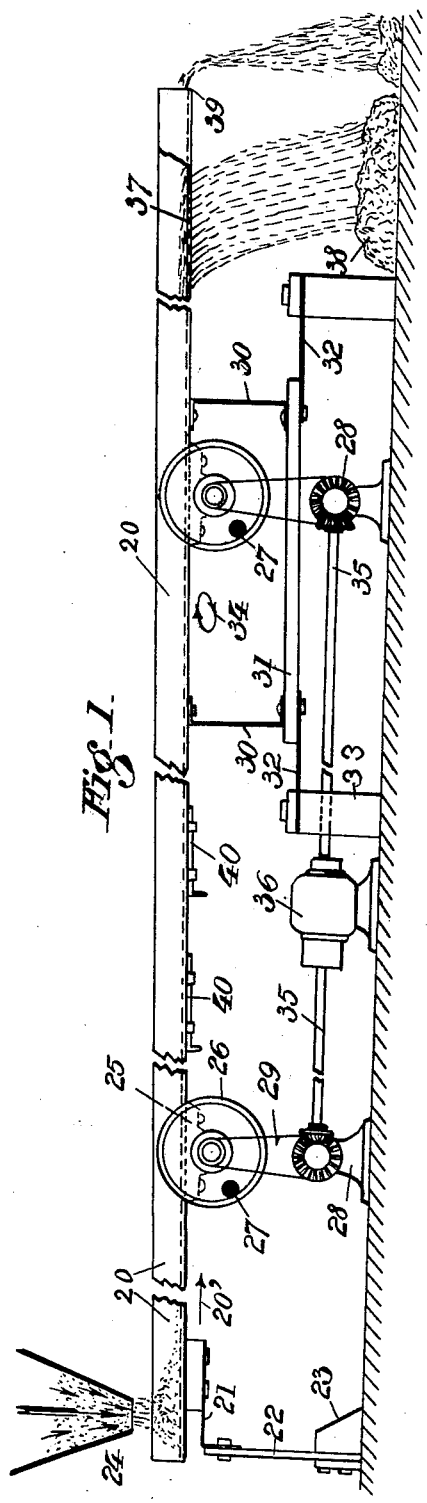
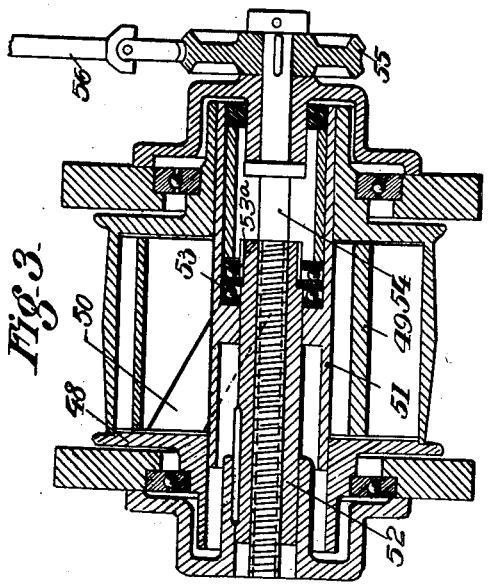
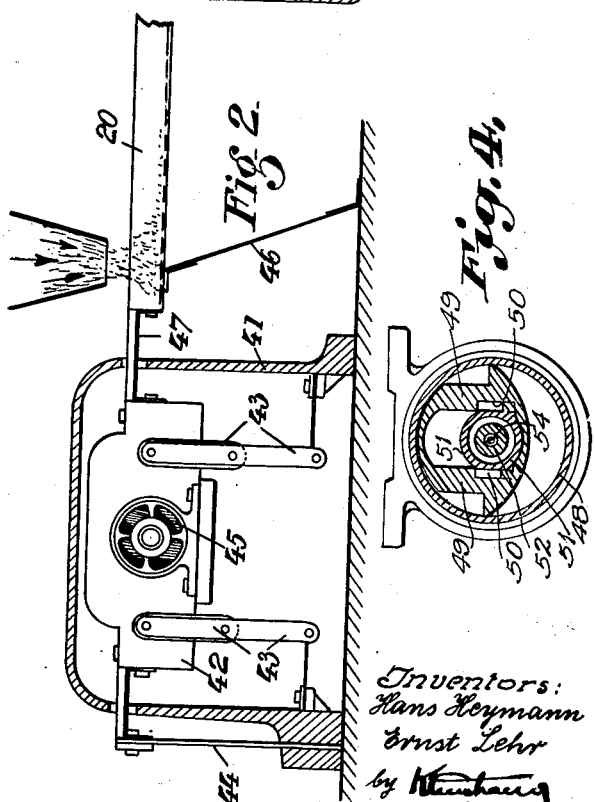
Inventors:
Hans Heymann
Ernst Lehr Patented May 17, 1932

1,858,328

UNITED STATES PATENT OFFICE

HANS HEYMANN AND ERNST LEHR, OF DARMSTADT, GERMANY, ASSIGNORS TO THE FIRM: CARL SCHENCK, EISENGIESSEREI UND MASCHINENFABRIK DARMSTADT G. M. B. H., OF DARMSTADT, GERMANY

CONVEYING OF MATERIAL

Application filed October 27, 1925, Serial No. 65,160, and in Germany October 31, 1924.

Our invention refers to the conveying of pulverulent or pasty materials such as flour, sand, concrete and the like, more especially in a horizontal or slightly inclined plane. It is an object of our invention to provide means whereby the conveying of such material can be effected more efficiently and with less expenditure of power than was hitherto possible.

According to the present invention the conveyance of such materials in mass is effected by means of troughs or similar conveying means resembling the so-called shaking troughs but which instead of being shaken are imparted vibrating motion. The term "vibrating" and "vibration" used in this specification and the claims affixed to it is intended to designate oscillations of an amplitude which does not substantially exceed one centimeter and will as a rule be only a few millimeters. On the other hand the number of such vibrations per unit of time is very great, mostly above 500 and preferably from 1000–2000 vibrations per minute.

Experience has shown that such vibrations will remove substantially all friction between the material to be transported and the bottom and walls of the trough or the like and in consequence thereof the material appears to be floating or flowing above the surface of the trough. Owing to this mode of conveyance the material transported does not in the least suffer from such transport and therefore this mode of transporting or conveying offers particular advantages, more especially in the case of materials which, for instance due to the moisture contained therein, tend to agglomerate, such as concrete or the like, or which when being conveyed in troughs of the usual type have a tendency of sticking together, as is the case for instance with flour or moulding sand. In a conveying device according to the present invention such agglomerating materials will on the contrary be subjected to a loosening action so that this device can for instance be utilized directly for the dressing of moulding sand or the like.

Inasmuch as the rapid vibrations cause the material to float above the surface of the trough, the vibrations need only occur substantially in a uniform direction and preferably in the direction of conveyance, a very slight downwards inclination of the conveying surface being only required for obtaining a comparatively great velocity of transport. It is however also possible to convey the material in horizontal and even in rising direction with a velocity which is great as compared with the small expenditure of forces required, such transport being effected by causing the trough or the like to vibrate in an elliptic path. Such vibrating motion will be particularly favorable if the longer axis of the ellipse extends substantially in the vertical plane which also contains the direction of transport, and preferably at an angle of 10–30° to the horizontal. The length of the shorter axis of the ellipse is of less importance and may even be reduced to zero. Such vibrating troughs for the transport in horizontal or rising direction can therefore also be mounted on the well known inclined rockable or pendulum supports, which are inclined to the horizontal at an angle between 60° and 80° according to the nature of the material to be transported. In consequence of the kind of movement and support of the trough as above described, the material to be transported, when the trough is set vibrating is imparted besides the forward acceleration in the direction of transport also an upward acceleration, which causes a loosening of the material from the walls of the trough and in consequence thereof a kind of movement of the material very similar to flow. Preferably the ratio of vertical acceleration and horizontal acceleration varies from 1:2 to 1:6, according to the character of the material to be transported.

Although any desired mechanical or other devices may be used for operating the trough and for producing the vibrations, the high number of vibrations per minute make it preferable to insert the trough, which is rigid as such, as a mass in an oscillatable system and in such case the operation of the trough, which produces the vibrations, is effected in or near resonance with the natural oscillation number of the oscillatable system of which the trough forms part. By this mode of operation the consumption of power is greatly reduced. The resiliency of the oscillatable system of which the trough forms part, can be obtained by means of the supports on which the trough rests and which may be resilient, pendulum or rocking supports. This mode of suspension and support is particularly recommendable in the case of light troughs designed for the transport of small quantities of material and in the case where the device producing the vibrations is mounted directly on the trough itself. It is however also possible to combine the resilient means with a separate driving motor, the trough itself resting only on comparatively weak supports which are substantially adapted to carry only the weight of the trough and of the material to be transported. This arrangement offers the advantage, which is particularly important in the case of long troughs, that the foundation is not exposed to the spring reaction and can therefore be made lighter, while the spring reactions are concentrated onto a single point, viz. the driving motor, so that a strong foundation need only be provided for this motor.

The production of the vibrations can be effected by means of driving impulses of any kind. The operation and the production of any number of impulses per unit of time can be effected in a very convenient and useful manner by producing the impulses by means of the centrifugal forces generated by unbalance masses whose axis is located in the oscillatable system and whose number of impulses is preferably equal or approaching the natural number of oscillations of the oscillatable system. This unbalance mass can be set moving either by means of a motor oscillating along with it, such as an electro motor or a compressed air engine rigidly connected with the vibrating trough, or for instance from a stationary motor by means of a belt or universal joint or a flexible shaft.

In the drawings affixed to this specification and forming part thereof some of the numerous embodiments of our invention are illustrated diagrammatically by way of example.

In the drawings

Fig. 1 is a side elevation showing several parts of a long trough driven at different points and supported by different means, the support of the trough being effected directly by means of springs.

Fig. 2 is a similar view of a modified form in which the trough is operated by means of a self-contained vibration producer.

Figs. 3 and 4 are an axial section and cross-section, respectively, of a particularly useful vibration producing device.

Referring first to Fig. 1 of the drawings, 20 is the conveying trough executing vibrating motion. This trough is suspended preferably in several places by means of a link or better still by means of leaf springs 21 on vertical or inclined standards, or leaf springs 22 which are fixed in place on the ground at 23. The trough is assumed to be slightly inclined from the left to the right. If it is set vibrating and suitable material is fed onto it at 24, this material will be conveyed or transported in the direction of the horizontal arrow 20' without suffering during this transport. Inasmuch as the trough 20 together with the material to be transported forms the main mass of an oscillatable system which is resiliently suspended substantially by means of the leaf springs 22, the consumption of power for setting it vibrating will be particularly low if the number of impulses producing the vibrations is equal to or approaches the natural number of oscillations or vibrations of the oscillatable system. Preferably this number is comparatively high, as the efficiency of the trough very materially increases with the number of vibrations per minute. Although it is possible to operate this trough by any desired means, it is preferable to use such driving means as allow conveniently producing such high frequencies of vibration.

If it is desired to operate the trough and to produce the vibrations by means of rotary motion, which will mostly be available, the trough may for instance be provided on its under side with bearings 25 supporting a rotary body 26, which may have the form of a disc and on which is mounted an unbalance mass 27. If the body 26 is for instance set rapidly rotating from the motor 28 by means of a belt 29, it will cause the entire system to vibrate rapidly, the expenditure of power being the lowest at or near resonance between the number of impulses per minute of the mass 27 on the one hand and of the oscillatable system consisting of the trough 20 and the springs 22 on the other. The direction of motion of the material is determined by the direction of rotation of the unbalanced mass.

In order to be able to make the number of impulses of the unbalance mass 27 to agree with the natural number of vibrations of the oscillatable system 20—22, any or all of the properties which influence this number, for instance the resiliency constant of springs 22, the size of the oscillating mass 20, the supply of material at 24, the inertia of the mass 20 relative to the axis of oscillation at 23, the number of rotations of the unbalance mass 26 and others may be adjustable.

On the other hand if it is desired to vary the amplitude of vibration of the trough 20, some or all of these parts can be so adjusted that the number of impulses per unit of time does no longer agree with the natural number of vibrations of the system. By thus proceeding it is possible even at a constant effect of the unbalance mass, to vary the amplitude of vibration within wide limits according to the degree of disagreement between the vibration producer 26, 27 and the oscillatable system 20—22. An example of application of this mode of operation will be described further below.

The righthand part of Fig. 1 illustrates a support for the trough which renders it unnecessary to incline it in the direction of transport, it being also possible to arrange it in horizontal or ascending position. This operation of the trough 20, to which may be fixed a vibration producer 26 with unbalance mass 27 similar to the one shown on the left side, is suspended by means of vertically or obliquely extending springs 30 on a frame 31 in such manner that it can oscillate in substantially horizontal direction. On the other hand frame 31 is suspended by means of springs 32 on the foundation plate 33 in such manner that the frame 31 can vibrate in vertical direction. In consequence of the impulses produced by the mass 27 and acting on it, this part of the trough 20 describes an elliptical path, as shown diagrammatically at 34. The proportion of the longer to the smaller axis of these elliptical vibrations is preferably variable by varying the conditions governing the form of the elliptical curve. These conditions may be so chosen that the longer axis of the ellipse is inclined towards the horizontal, the small axis of the ellipse being made as small as desired.

In the case of shorter troughs of for instance up to 40 meters, a single drive will be sufficient. If, as assumed in Fig. 1, a longer trough is employed, it is preferable to provide several driving devices. In this case all these devices 28 must be coupled for instance by means of shaftings 35 which may be acted upon by the driving motor. The coupling must be effected in such manner that the several drives operate in synchronism and that all the vibration producers 26, 27 rotate in phase.

The rapid short vibrating movements to which the material transported is exposed, can also be utilized with advantage during or at the end of the transport for dressing or sizing of the material. At 37 in Fig. 1 part of the bottom of the trough is shown as having the form of a sieve, so that the finer particles of the material transported are separated out at 38, while the coarser particles leave the trough at 39. Several such sizing points 40 may be arranged in series, each of them being preferably adapted to be closed by means of slides or the like.

Instead of mounting the vibration producer on the trough 20 itself, forming the main mass of the system 20—22 as shown in Fig. 1, it will frequently be preferable to combine the oscillating system including the vibration producer into a self-contained unit which can then be combined with one or several conveying troughs according to the requirements. It is thus rendered possible to use a single, preferably portable driving motor for operating all the troughs of the system of troughs which shall be operated intermittently.

A self-contained unit of this kind is shown diagrammatically in Fig. 2 where 41 is a casing surrounding a mass 42 which is supported for vibration in a straight line by means of links 43, the lower ends of which are resiliently suspended on the casing 41. A spring, for instance a leaf spring 44 is connected with the mass 42 in a suitable manner. In the mass 42 is enclosed the vibration producer formed for instance of an electromotor 45 provided with an adjustable unbalance mass. (Figs. 3 and 4.)

The parts 41, 42, 43, 44, 45 form a self-contained portable unit which combines the oscillatable system and the oscillation or vibration producer in such manner that on the motor 45 being started, the body 42 is set rapidly vibrating. With a driving unit of this kind a trough 20 can be connected in a suitable manner, for instance by means of a sheet metal band 47, this trough being for instance mounted in a well known manner on inclined rockable or pendulum supports 46 which are only required to mainly or exclusively support the trough 20 and the material to be transported and need therefore be connected with the foundation only in a superficial manner inasmuch as they do not transmit any resilient forces, the back-pressure or reaction of the spring being already concentrated in the driving unit 41, 42, 43, 44, 45, so that only this unit requires a strong foundation.

A particularly useful vibration producer, which can also be conveniently adjusted during service, is shown in Figs. 3 and 4. This device can for instance be mounted within the armature of the driving electromotor or as shown in Figs. 3 and 4 its casing can have the form of a pulley. In the central portion of this device is arranged a slide block 49 forming the unbalance mass in such manner that its position in axial direction cannot be altered, while it is free to be displaced radially to the drum-shaped casing 48. To this end there are provided in the sliding block two notches 50 extending in parallel and obliquely to the axis of rotation of the drum. Into these notches project two lugs forming part of a shaft 51 which is concentrically mounted in the drum and rotates together with the casing 48 and the slide block 49 relative to an internally threaded sleeve 52 which is prevented from axial displacement relative to shaft 51 by the double-acting ball bearings 53. The sleeve 52 is secured in the casing against rotation by means of a key and slot connection 53ª and axially displaced by means of a threaded spindle 54 which can be rotated from a stationary point by means of a worm wheel 55 and a worm mounted for instance on a Cardan shaft 56. By rotating this shaft the sliding block 49 can be moved during its rotation radially outwards or inwards and in consequence of such movement the power of impulses produced by the vibration produced can be adjusted very nicely.

The term "trough" as used in the claims is meant to comprise also other than trough-shaped conveying means.

We wish it to be understood that we do not desire to be limited to the exact details of construction and operation shown and described for obvious modifications will occur to a person skilled in the art.

We claim:—

1. A conveying device comprising a conveying trough, a motor, a casing surrounding said motor and secured to said trough, a mass movable and guided in said casing, an unbalanced member located in said mass and an operative connection between said motor and said trough.

2. A conveying device comprising a conveying trough, a motor, a casing surrounding said motor and secured to said trough, a mass movable and guided in said casing, an unbalanced member located in said mass, an operative connection between said motor and said trough and means for adjusting said mass relative to said casing during operation.

3. A conveying device comprising a conveying trough, two vibration producers operatively connected with said trough and means for positively coupling said producers.

4. A conveying device comprising a conveying trough, two vibration producers operatively connected with said trough and means for positively coupling said producers for synchronous working.

5. A conveying device adapted to vibrate at a frequency of at least 500 vibrations per minute, comprising a conveying trough imperforate for the greater portion of its length, means for causing said trough to vibrate comprising a rotary body, and an unbalanced mass adjustable with respect to the radius of said rotary body.

6. A conveying device adapted to vibrate at a frequency of at least 500 vibrations per minute, comprising a conveying trough imperforate for the greater portion of its length, means for causing said trough to vibrate comprising a rotary body and an adjustably mounted unbalanced mass.

7. A conveying device adapted to vibrate at a frequency of at least 500 vibrations per minute, comprising a conveying trough imperforate for the greater portion of its length, means for causing said trough to vibrate comprising a rotary body and an unbalanced mass, restricted as to movement with respect to axis of said rotary body and free to move in a radial direction with respect to said rotary body.

8. A conveying device comprising a conveying trough imperforate for the greater portion of its length, a resilient support comprising resilient means permitting lateral displacement of said trough, auxiliary resilient means permitting vertical displacement of said trough, the resultant displacement describing an elliptical path whereby the said trough is adapted to convey material in a direction which is inclined to the horizontal and means causing said trough to vibrate in the aforesaid elliptical path at a frequency of more than five hundred vibrations per minute.

9. A conveying device comprising a conveying trough imperforate for the greater portion of its length, a resilient support comprising resilient means permitting lateral displacement of said trough, auxiliary resilient means permitting vertical displacement, of said trough the resultant displacement describing an elliptical path whereby the said trough is adapted to convey material in a direction which is inclined to the horizontal at an angle of 5° to 25° and means causing said trough to vibrate in the aforesaid elliptical path at a frequency of more than five hundred vibrations per minute.

In testimony whereof we affix our signatures.

HANS HEYMANN.
ERNST LEHR.